(12) United States Patent
Parazak

(10) Patent No.: US 6,500,880 B1
(45) Date of Patent: Dec. 31, 2002

(54) BLACK TO COLOR BLEED CONTROL USING SPECIFIC POLYMERS IN INK-JET PRINTING INKS CONTAINING PIGMENTED INKS REQUIRING DISPERSANTS

(75) Inventor: Dennis P. Parazak, Corvallis, OR (US)

(73) Assignee: Hewlett-Packard Comapny, Palo Alto, CA (US)

( * ) Notice: Subject to any disclaimer, the term of this patent is extended or adjusted under 35 U.S.C. 154(b) by 0 days.

(21) Appl. No.: 09/697,902

(22) Filed: Oct. 26, 2000

(51) Int. Cl.$^7$ .......................... C09D 11/10; C08L 33/02
(52) U.S. Cl. ................ 523/160; 524/284; 524/320; 524/321; 524/403; 524/417; 524/419; 524/429; 524/519; 524/520; 524/521; 524/555; 524/560
(58) Field of Search ............... 524/555, 560, 524/519, 520, 521, 584, 320, 321, 419, 417, 429, 403; 523/160; 347/100

(56) References Cited

U.S. PATENT DOCUMENTS

| | | | |
|---|---|---|---|
| 2,833,736 A | 5/1958 | Glaser et al. ............... 260/29.6 |
| 3,607,813 A | 9/1971 | Purcell et al. .............. 260/29.6 |
| 4,104,061 A | 8/1978 | Roberts ........................ 75/211 |
| 4,136,076 A | 1/1979 | Daniels .............. 260/29.6 HN |
| 4,246,154 A | 1/1981 | Yao ..................... 260/29.6 TA |
| 4,545,818 A | 10/1985 | Inoue et al. .................. 106/22 |
| 4,770,760 A | 9/1988 | Noda et al. ................. 204/425 |
| 4,963,189 A | 10/1990 | Hindagolla .................. 106/22 |
| 5,026,755 A | 6/1991 | Kveglis et al. ............. 524/389 |
| 5,085,698 A | 2/1992 | Ma et al. ...................... 106/20 |
| 5,133,803 A | 7/1992 | Moffatt ........................ 106/25 |
| 5,156,675 A | 10/1992 | Breton et al. ................. 106/22 |
| 5,181,045 A | 1/1993 | Shields et al. ............... 346/1.1 |
| 5,198,023 A | 3/1993 | Stoffel ...................... 106/22 R |
| 5,272,201 A | 12/1993 | Ma et al. .................... 524/505 |
| 5,316,575 A | 5/1994 | Lent et al. ................ 106/20 R |
| 5,320,668 A | 6/1994 | Shields et al. ............ 106/20 R |
| 5,428,383 A | 6/1995 | Shields et al. ................ 347/96 |
| 5,476,540 A | 12/1995 | Shields et al. ............ 106/20 R |
| 5,488,402 A | 1/1996 | Shields et al. ................ 347/96 |
| 5,518,534 A | 5/1996 | Pearlstine et al. ........ 106/20 R |
| 5,536,306 A | 7/1996 | Johnson et al. ........... 106/22 R |
| 5,536,761 A | 7/1996 | Fujita ......................... 523/160 |
| 5,555,008 A | 9/1996 | Stoffel et al. ............... 347/100 |
| 5,596,027 A | 1/1997 | Mead et al. ................. 523/161 |
| 5,618,338 A | 4/1997 | Kurabayashi et al. ..... 106/26 R |
| 5,623,294 A | 4/1997 | Takizawa et al. ............. 347/98 |
| 5,630,868 A | 5/1997 | Belmont et al. ......... 106/31.75 |
| 5,648,405 A | 7/1997 | Ma et al. .................... 523/160 |
| 5,679,143 A | 10/1997 | Looman ................... 106/20 R |
| 5,686,508 A | 11/1997 | Shimomura et al. ........ 523/161 |
| 5,695,820 A | 12/1997 | Davis et al. ................. 427/261 |
| 5,696,182 A | 12/1997 | Kashiwazaki et al. ...... 523/161 |
| 5,700,317 A | 12/1997 | Adamic ................... 106/31.58 |
| 5,712,338 A | 1/1998 | Donovan et al. ........... 524/505 |
| 5,713,993 A | 2/1998 | Page et al. ............... 106/31.85 |
| 5,730,790 A | 3/1998 | Rehman .................. 106/31.59 |
| 5,734,403 A | 3/1998 | Suga et al. ................. 347/101 |
| 5,735,941 A * | 4/1998 | Feeman et al. .......... 106/31.28 |
| 5,744,519 A | 4/1998 | Heraud et al. ............... 523/160 |
| 5,785,743 A | 7/1998 | Adamic et al. .......... 106/31.27 |
| 5,849,815 A | 12/1998 | Aoki et al. .................. 523/161 |
| 5,853,465 A | 12/1998 | Tsang et al. ............. 106/31.25 |
| 5,889,083 A | 3/1999 | Zhu ............................ 523/161 |
| 5,922,118 A | 7/1999 | Johnson et al. ............ 106/31.6 |
| 5,948,512 A | 9/1999 | Kubota et al. .............. 428/195 |
| 5,958,121 A | 9/1999 | Lin .......................... 106/31.43 |
| 5,965,634 A | 10/1999 | Idogawa et al. ............ 523/161 |
| 5,998,501 A | 12/1999 | Tsutsumi et al. ........... 523/160 |
| 6,020,400 A | 2/2000 | Anton et al. ................ 523/161 |
| 6,040,358 A | 3/2000 | Page et al. .................. 523/161 |
| 6,051,645 A | 4/2000 | Suzuki et al. ............... 524/500 |
| 6,086,198 A * | 7/2000 | Shields et al. .............. 347/100 |
| 6,281,267 B2 * | 8/2001 | Parazak ...................... 523/160 |

FOREIGN PATENT DOCUMENTS

EP          838507 A1    4/1998

OTHER PUBLICATIONS

Personal Cara Polymers, National Starch & Chemical Company: "A Guide to the Balance, Series of Hair Fixatives", no date.

Personal Care Polymers, National Starch & Chemical Company: "Balance 0/55 Low VOC Hair Fixative", 1997.

Personal Care Polymers, National Starch & Chemical Company: "Balance CR Low VOC Hair Fixative", 1997.

Personal Care Polymers, National Starch & Chemical Company: "Balance 47 Low VOC Hair Fixative", 1998.

Personal Care Polymers, National Starch & Chemical Company: "Amphomer 4910, Hard Holding Hair Fixative", 1998.

Personal Care Polymers, National Starch & Company: "RESYN 28–2930, Excellent Holding Power for Hair Sprays", 1994.

Personal Care Polymers, National Starch & Chemical Company: "Selector Guide, Characterization Of Our 55% VOC Non–Aerosol Prototypes", no date.

Personal Care Polymers, National Starch & Chemical Company: "Formulation, High Solids 55% VOC Pump 7625:97B", no date.

Personal Care Polymers, National Starch & Chemical Company: "Formulation, Alcohol Free Pump Spritz, 8757:120–2", no date.

Personal Care Polymers, National Starch & Chemical Company: "Formulation, High Performance 55% VOC Non–Aerosol Hair [Srpay] Spray 9160:017", no date.

(List continued on next page.)

*Primary Examiner*—Judy M. Reddick
(74) *Attorney, Agent, or Firm*—Michael D. Jones

(57) ABSTRACT

The ink set of this invention comprises at least two inks, one of which contains a pH sensitive polymer and pigment colorant with dispersant. A second ink is provided which comprises incompatible inorganic or organic salts or has an appropriate pH. The polymer precipitates onto a medium upon contact with the second ink, thereby providing improved bleed control.

31 Claims, No Drawings

OTHER PUBLICATIONS

Personal Care Polymers, National Starch & Chemical Company: "Formulation, 55% VOC Pump Hair Spray, 9612:79A", no date.

Personal Care Polymers, National Starch & Chemical Company: "Formulation, 55% VOC Pump Hair Spray, 9612:79B", no date.

Personal Care Polymers, National Starch & Chemical Company: "Formulation, 55% VOC Pump Hair Spray, 9612:79C", no date.

Personal Care Polymers, National Starch & Chemical Company: "Formulation, 55% VOC Pump Hair Spray, 9612:80A", no date.

Personal Care Polymers, National Starch & Chemical Company: "Formulation, 55% VOC Pump Hair Spray, 9612:80B", no date.

Personal Care Polymers, National Starch & Chemical Company: "Formulation, Fast Drying 55% VOC Aerosol Hair Spray, 8409:85D", no date.

Personal Care Polymers, National Starch & Chemical Company: "Formulation, 55% Voc Aerosol Hair Spray, 8757:118–5", no date.

Personal Care Polymers, National Starch & Chemical Company: "Formulation, 55% VOC Aerosol Hair Spray, 8757:118–7A", no date.

Personal Care Polymers, National Starch & Chemical Company: "Formulation, 55% VOC Aerosol Hair Spray, 8897:1B", no date.

Personal Care Polymers, National Starch & Chemical Company: "Formulation, High Performance, Low Cost 55% VOC Aerosol Hair Spray 8897:22A", no date.

Personal Care Polymers, National Starch & Chemical Company: "Formulation, 55% VOC Sculpting Hair Spray, 9612:99R", no date.

Personal Care Polymers, National Starch & Chemical Company: "Formulation, 55% VOC High Performance Aerosol Hair Spray, 9612:101", no date.

Personal Care Polymers, National Starch & Chemical Company: "Summary of the Benefits and Applications of NSC Hair Fixative Polymers", no date.

"The Hard Copy Observer" Feb. 2000, vol. X, No. 2, (pp. 1, 60–64).

Dean, John A. "Lange's Handbook of Chemistry" 1999 15th Ed., McGraw–Hill New York (pp. 8.33, 8.50, 8.56, 8.63–8.65).

Morrison, Robert Thornton and Boyd, Robert Neilson; "Organic Chemistry" 1987 5ed., Allyn and Bacon Boston (p. 839).

"Resyn 28–2930, Excellent Holding Power For Hair Sprays." Personal Care Polymers, National Starch and Chemical Company, 10pp. No date.

"Amphomer LV–71 (28–4971) For Hard Holding Hair Fixative Formulations." Personal Care Polymers, National Starch and Chemical Company. 6pp. No date.

"Amphomers LV–71 (28–4910) For Hard Holding Hair Fixative Formulations." Personal Care Polymers, National Starch and Chemical Company. 6pp. No date.

* cited by examiner

BLACK TO COLOR BLEED CONTROL USING SPECIFIC POLYMERS IN INK-JET PRINTING INKS CONTAINING PIGMENTED INKS REQUIRING DISPERSANTS

TECHNICAL FIELD

The present invention relates to ink-jet inks employed in ink-jet printing. In particular, this invention relates to an ink system that utilizes the addition of specific polymers to conventional, non-self dispersing pigment-based ink. These polymers reduce, and in some cases even eliminate, color bleed problems typically associated with ink-jet printing.

BACKGROUND ART

Ink-jet printers offer a low cost, high quality, and comparatively noise-free option to other types of printers commonly used with computers. Such printers employ a resistor a element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current-carrying signals cause one or more selected elements to heat up. The heating creates a bubble of ink in the chamber, which expels ink through the nozzle toward the print medium. In this way, firing of a plurality of such resistor elements in a particular order in a given primitive forms alphanumeric characters, performs area-fill, and provides other print capabilities on the medium.

When some ink-jet inks are printed adjacent to each other a condition called "bleed" can appear. Bleed occurs as colors mix both on the surface of the paper being printed on and in the paper. The terms "bleed", as used herein, are defined as follows: when inks of two different colors are printed next to each other, it is desired that the border between the two colors be clean and free from the invasion of one color into the other. When one color does invade into the other, the border between the two colors becomes ragged, and this is called bleed. This is in contradistinction to uses of the term "bleed" in the prior art, which often defines "bleed" in the context of ink of a single color following the fibers of the paper.

Prior solutions to bleed have largely involved the use of heated platens or other heat sources and/or special paper. Heated platens add cost to the printer. Special paper limits the user to a single paper, which is of a higher cost than a plain paper. Another way to reduce bleed involves increasing the penetration rate of the ink into the paper. However, increasing the penetration rate reduces the edge acuity (lowers the print quality of the ink). Nevertheless, this method is acceptable for printing color ink because of the lesser importance of color text quality. However, print quality is important for black ink. And hence, alternate bleed control mechanisms are needed.

U.S. Pat. No. 5,428,383 teaches a method to control bleed in multicolor ink-jet printing involving the use of multivalent metal salts as precipitation agents in a first ink composition. The precipitation agent is designed to react with the coloring agent in a second ink composition.

A solution to the specific problem of black to yellow color bleed is disclosed in U.S. Pat. No. 5,198,023 wherein multivalent cations such as calcium chloride and magnesium chloride are added at concentrations ranging from about 1 to about 10 wt % to yellow cationic inks to prevent bleed between yellow and black inks. However, it has been determined that the addition of large amounts of multivalent cations to thermal ink-jet ink compositions may induce precipitation of dye salts, requiring further adjustments in the ink composition. U.S. Pat. No. 5,518,534 teaches the use of a first ink having a pigment dispersion and the second ink containing a salt of an organic acid or mineral acid wherein said salt reacts with said first ink to alleviate bleed between the inks. However, in this case, the pigment requires the presence of a dispersing agent, and both inks must have the same ionic character.

A method to control bleed is also disclosed by U.S. Pat. No. 5,730,790. The ink-jet ink is formulated to comprise at least one dye-based ink composition and at least one pigment-based ink. The dye-base ink also contains a cationic surfactant, and the pigment-base ink contains a negatively charged dispersant.

Another method of reducing bleed between ink-jet inks involves the use of pH-sensitive dyes as disclosed in U.S. Pat. No. 5,181,045. It discloses an ink having a pH-sensitive dye to prevent bleeding to an adjacent ink having an appropriate pH. Migration of the ink having the pH-sensitive dye is prevented by rendering the dye insoluble on the page by contact with the pH of the adjacent ink. This method requires a pH differential of about 4 or 5 units to completely control bleed. Accordingly, a pH not exceeding 4 would be required to effectively eliminate bleed from a pH-sensitive ink having a typical pH of about 8.

U.S. Pat. No. 5,679,143 builds upon the '045 case referenced above, but an organic acid component is added to the so-called target ink-jet ink composition, as opposed to the pH-sensitive ink composition. The organic acid component reduces the pH differential required to control bleed to about 3 units or less.

While each of the above has produced varying degrees of success, a need still remains for pigment-based (non self-dispersing) ink compositions for use in ink-jet printing which do not evidence bleed, as defined herein, when printed on plain papers, and yet which posses relatively long shelf life and other desirable properties of such inks.

DISCLOSURE OF INVENTION

In accordance with the invention, an ink set is provided in which certain pigment-based inks contain polymers which become insoluble under either specific and well defined pH conditions or when contacted with incompatible ionic substances. By forcing the polymers present to become insoluble on the page, migration of the colorant is inhibited, thereby helping to reduce bleed between different colors. Rendering the polymers insoluble is achieved by making the polymer come out of solution or to precipitate; this is done by contacting the polymer with another ink having an appropriate pH or one which contains ions that are incompatible with the polymers, or both.

The specific polymers disclosed herein are added to pigmented inks that are stabilized by a dispersant. Thus, in systems in which a dispersant yields a very stable dispersant but is not useful in the control of bleed, the specific polymers herein can be added in small quantities to enhance bleed performance. A further advantage of adding these specific polymers is that the concentration of acids and/or incompatible ions in the color inks can be significantly reduced. Lowered concentrations of the acids and ions in the color inks means that the ink will have better stability, better compatibility with pen materials, and will fire more reliably from pens. Thus, the combination of a dispersed pigment along with these bleed-reducing polymers provide for a very stable pigmented ink composition which have components which precipitate out of solution without adversely affecting the overall pigment's stability.

BEST MODES FOR CARRYING OUT THE INVENTION

It has long been known that certain colorant classes, especially pigments, are insoluble or become insoluble under specific and well defined pH conditions or in the presence of incompatible ions. Thus, the use of pigments in ink formulations has been limited to either 1) pigments in conjunction with dispersants or 2) self-dispersing pigments. Moreover, the dispersant must have two attributes. First, it must be able to stably disperse the pigment in the aqueous ink composition. Second, it is desirable for the dispersant to provide some measure of bleed control, or at the least not promote bleed. Industry has been challenged in formulating ink with the above limitations. However, now with this invention, a specific group of polymers has been found which precipitate under certain pH conditions or in the presence of certain ions, but do not affect the dispersability of the pigment. These polymers allow for the use of a broader class of materials, particularly dispersants that have not been previously associated with good bleed control. Additionally, since the class of non-self dispersing pigments far outnumbers the class of self-dispersing pigments, the formulator has an increased choice of available pigments as well. Use of these specific polymers thus allows for formulation flexibility because these polymers do not interfere with the dispersion or water-solubility of the pigment. This new class of polymers can be utilized for dispersion without concern of their ability to affect bleed. By utilizing a separate dispersant to disperse the pigment, the polymers of this invention can be designed to be pH and ion/or sensitive yet have little or no dispersing ability.

An advantage of the polymer's ion sensitivity is the ability to formulate an ink composition with reduced levels of reactive ions. Since these polymers precipitate in the presence of low levels of ions, the secondary ink, which contains the ions, can be formulated to have much lower levels; thus, adding to the flexibility of the formulation and the stability of the ink.

Without subscribing to any particular theory, the Applicants believe that by forcing a polymer contained in an ink to become insoluble on the page, then migration of the colorant in the ink will be inhibited, thereby helping to reduce bleed between the inks. The "force" used to make the polymer come out of solution or to precipitate is to contact the polymer containing ink with another ink having an appropriate pH or containing incompatible ions.

Polymers

The polymers of this invention can be random or block copolymers and contains at least one of each of the following: 1) basic amine monomer, 2) acid monomer, and 3) hydrophobic monomer. The polymers are selected to precipitate with a change of pH or in the presence of certain ions or both. In general, polymers which precipitate with a change from higher to lower pH will comprise monomers containing an acidic group and a hydrophobic group; polymers which precipitate with a change from lower to high pH will comprise monomers containing amine functionality and hydrophobic moieties. The structure for the polymers of this invention is:

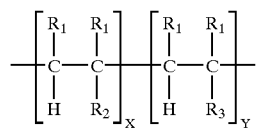

wherein $R_1$ are independently selected from H or a $C_{1-C18}$ substituted or unsubstituted, branched or unbranched, alkyl, aromatic, or cyclic chain and may contain halogen, ester, ether, amine or amide functionalities, and is preferably H, $CH_3$, a halogen or a halogenated methyl group; and $R_2$ is a group containing either a carboxylic acid group having a $pK_a$ of from about 5.0 to about 7.5, or a primary, secondary, or tertiary amine functionality. $R_3$ is a $C_1$–$C_{18}$ substituted or unsubstituted, branched or unbranched, alkyl, aromatic, or cyclic chain, which may contain ester, ether, amine or amide functionalities. Examples of monomers of type X that contain carboxylic acids that are useful in the invention include, but are not limited to; acrylic acid, methacrylic acid, crontonic acid, 2-trifluoromethylacrylic acid and 2-bromoacrylic acid. Typically, polymers containing acidic $R_2$ monomers will be present in the ink as acid salts of Na, K, Li, triethanolamine, 2-amino-2-methyl-1propanol and the like. Examples of monomers of type X that contain primary, secondary, and tertiary amines that are useful in the invention include, but are not limited to; 2-(diethylamino)ethyl acrylate, 2-(dimethylamino)ethyl acrylate, 3-(dimethylamino)propyl acrylate, butylaminoethyl methacrylate, 2-aminoethyl methacrylate and N-[3-(dimethylamino)propyl]acrylamide. Typically, polymers containing primary secondary, and/or tertiary amine $R_2$ monomers alone will be present in the ink as salts of Cl, Br, I, sulfate, nitrate, and the like. Hydrophobic monomers of type Y that are useful in the invention include, but are not limited to; methyl and ethyl esters of acrylic and methacrylic acids, ethyl-2-(bromomethyl) acrylate, propyl acrylates and methacrylates, butyl a acrylates and methacrylates, isoamyl acrylate, hexyl acrylates and methacrylates, cyclohexyl acrylates and methacrylates and their alkyl derivatives, ethylhexyl acrylates and methacrylates, trimethylhexyl acrylate, isooctyl acrylate, isodecyl acrylate, dodecyl acrylate, tridecyl methacrylate, octadecyl acrylate, isobornyl acrylate and methacrylate, phenyl methacrylate, benzyl methacrylate, 2-butoxyethyl acrylate and methacrylate, 2-ethoxyethyl acrylate, neopentyl glycol acrylate benzoate, ethylene glycol phenyl ether acrylate, hydroxybutyl acrylate, alkyl esters of crotonic acid, N,N-dimethylacrylamide, N-isopropylacrylamide and methacrylamide, N-octylacrylamide, N-(butoxymethyl) acrylamide, N-(isobutoxymethyl)acrylamide, methyl-2-acrylamido-2-methoxyacetate, vinyl acetate, vinyl neodecanoate, cyclohexyl vinyl ether, 2-ethylhexyl vinyl ether and styrene. Polymers of this invention may contain more than one X-type or Y-type monomer.

Polymers that have acidic groups, such as carboxylate groups, are pH sensitive. These carboxylated, or otherwise acidified, polymers will either be in solution or precipitate based on their pH-dependant solubility. As the pH is lowered and the carboxylate groups become protonated, the solubility of the polymer decreases. At some point, the polymer will begin to become unstable and will effectively drop out of solution. Typical polymers for use herein include those having at least one and preferably multiple carboxyl groups, which commonly consist of acrylic monomers and polymers known in the art. Hydrophobic moieties are also required to aid in the precipitation of the polymer and induce flocculation of the pigment in an aqueous based ink. When the polymer carries a net anionic charge, the pigment must also carry a net anionic or nonionic charge.

The average molecular weight of the polymers of this invention ranges from about 1,000 to about 20,000, preferably from about 1,000 to about 12,000; more preferably from about 3,000 to about 10,000. The above monomers are provided in sufficient amounts to provide a polymer that will be stable when solubilized in water at the appropriate pH, yet will effectively precipitate and flocculate the pigment upon the change in pH or contact with the appropriate ions. Thus, polymers may be selected which comprise other monomers as long as an effective amount of the above monomers comprise part of the polymer chain.

In a preferred embodiment, $R_2$ is a carboxylic acid moiety, thus having the structure:

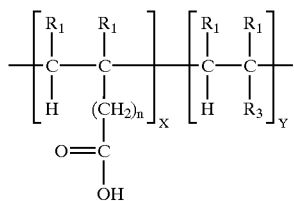

wherein $R_1$ are independently selected from H or a $C_1$–$C_{18}$ substituted or unsubstituted, branched or unbranched, alkyl, aromatic, or cyclic chain and may contain ester, ether, amine or amide functionalities, and is preferably H, $CH_3$, a halogen or a halogenated methyl group; and n is from 0 to 15, preferably 0 to about 3, so as long as the group has $pK_a$ of from about 5.0 to about 7.5. $R_3$ is a $C_1$–$C_{18}$ substituted or unsubstituted, branched or unbranched, alkyl, aromatic, or cyclic chain, which may contain ester, ether, amine or amide functionalities.

The acidity, measured by the acid number, of these polymers is in the range of 55–400 mg KOH/g of polymer; preferably from 80–350 mg KOH/g of polymer; more preferably from 80–200 mg KOH/g of polymer. When the polymers have X-type monomers without acidic groups and the $R_2$ groups contain primary, secondary, and/or tertiary amine functionality, the amount of basic nitrogen in the polymer, measured as the meq of basic nitrogen per gram, ranges from between about 1 to about 7 meq/g, preferably about 1.5 to about 6.2 meq/g and even more preferably between about 1.5 to about 3.5 meq/g.

The following examples of polymers that are useful in this invention are not intended to limit the scope of the invention. Monomer ratios are given in weight percent. Molecular weights conform to the ranges given above. Examples; a) 8:92 acrylic acid:butyl acrylate, acid number 62 mg KOH/g; b) 10:90 methacrylic acid:butyl acrylate, acid number 65 mg KOH/g; c) 12:88 acrylic acid:ethyl acrylate, acid number 93 mg KOH/g; d) 14:86 methacrylic acid:ethyl acrylate, acid number 91 mg KOH/g; e) 16:60:24 acrylic acid:methyl methacrylate:hexyl acrylate, acid number 125 mg KOH/g; f) 16:5:15:64 acrylic acid:butylaminoethyl methacrylate:octylacrylamide:methylmethacrylate, acid number 125 mg KOH/g; g) 19:40:41 methacrylic acid:ethyl acrylate:methyl methacrylate, acid number 124 mg KOH/g; h) 30:30:30 methacrylic acid:methyl methacrylate:benzyl methacrylate, acid number 195 mg KOH/g; and i) 44:56 acrylic acid:ethyl acrylate, acid number 325 mg KOH/g. Other combinations could also be made. Some modifications could be made by those skilled in the art and still be within the spirit of the invention.

The use of pH sensitive polymers should not be confused with the use of pH changes on paper, which lead to improved waterfastness. First, waterfastness issues involve the ability of the ink to resist smearing when water is dripped across a printed line of ink, while bleed resistance is the ability of the ink to resist mixing of one color with another when both are printed in close succession. Having solved one problem does not imply a solution to the other.

Solving waterfastness in other systems has involved the use of a single ink. This is in contrast to the present invention in which a second ink is used to bring about the desired effect, i.e., reduction of bleed.

In addition, the present invention involves what is essentially a border effect, i.e., the drastic pH conditions of the two inks in question or the presence of incompatible ions in one of the inks bring about the desired effect at the border of the two inks. This differs with the mode in which other dye-based inks achieve waterfastness, i.e., an entire dot of black ink is subjected to paper which lowers the pH slightly and brings about insolubility (and thus waterfastness); see, e.g., U.S. Pat. No. 4,963,189.

Finally, it should be mentioned that using a second ink with a pH of, for example, 4 will have a much greater effect on the solubility of the pH-sensitive polymer than will any pH change caused by the paper. Paper-induced pH changes in the ink are small compared to contact with a fluid that is buffered at a pH of 4. Thus, while it is thought that the pH of the paper itself contributes to an improvement of waterfastness, in the present application, a second ink, having a pH low enough to bring about insolubility of polymers in the first ink or the presence of specific polymer-incompatible ions, is used to bring about the desired effect, i.e., bleed reduction.

The method of the invention eliminates the requirement of a heater or heated platen in order to reduce bleed from an ink of one color into an ink of another color, and the need for special paper to control bleed between inks that otherwise would bleed on plain types of paper.

While the specific example given is directed to the use of an ink having a lower pH than the first ink, it is also possible to employ an ink having a higher pH than the initial ink. In this case, the pH-sensitive ink would have the property that it precipitates as the pH is increased. For example, if the polymer is soluble at a low pH by carrying a positive charge through protonation of an amine group on the polymer, it is possible to precipitate the polymer by contacting it with a second ink that is buffered at a high pH causing deprotonation of the polymer. This system would work in conjunction with pigments that are either dispersed by dispersants containing nonionic or with a cationic charged moieties.

The effect on bleed may be seen at a pH difference of about 1 to 3 units. Further and near complete control of bleed results when the pH difference is further increased, to about 4 to 5 units. However, these values do not preclude the use of a polymer which is more sensitive to pH than those disclosed herein; with more sensitive pH-polymers, near complete control of bleed could result with only a small difference in PH, considerably less than 4 units.

Multivalent Salts

In one embodiment herein, the polymers of this invention interact with incompatible multi-valent (inorganic or organic) salts in the second ink. These salts must be soluble in the ink in the concentration employed. Suitably-employed cations for the multi-valent salt include alkaline earth metals of group 2A of the periodic table (e.g., magnesium and calcium); the transition metals of group 3B of the periodic table (e.g., lanthanum); cations from group 3A of the periodic table (e.g., aluminum); and lanthanides (e.g., neodymium). Preferably, calcium and magnesium are employed as cations in the practice of this invention. Suitably employed anions associated with calcium or magnesium include nitrate, chloride, acetate, benzoate, formate, and thiocynate. Salts preferably employed in this invention are nitrate, chloride, and acetate salts of calcium and magnesium. If used, the salt should be present in the second ink in an amount ranging from about 1% to about 10%, preferably from about 1.5% to about 7%, more preferably from about 2% to about 6% by weight of the ink.

Organic Acid

Examples of organic acids which may be included in the second ink to aid in the pH and buffering capabilities of the second ink include, but are not limited to, mono-, di-, and polyfunctional organic acids. In general, it is contemplated that any soluble organic acid having a $pK_a$ equal to or less than that of the pH-sensitive polymer of concern may be suitably employed. Preferably, one of the following classes of organic acids is employed: polyacrylic, acetic, glycolic, malonic, malic, maleic, ascorbic, succinic, glutaric, fumaric, citric, tartaric, lactic, sulfonic, and ortho-phosphoric acid, derivatives thereof, and mixtures thereof. If used, the organic acid should be present in the second ink in an amount ranging from about 1% to about 10%, preferably from about 2% to about 7%, more preferably from about 3% to about 6% by weight of the ink.

Pigments/Dispersants

A wide variety of organic and inorganic pigments, either alone or in combination, may be benefited in the practice of this invention, since it is contemplated that any pigments or combination thereof may be benefited in the practice of this invention. The term "pigment" as used herein mean a water insoluble colorant. In practice, pigment particles are deagglomerated or dispersed in aqueous media to achieve greater uniformity in print quality of the ink. Any means for dispersing the pigment particles that is compatible with the remaining ink components may be employed in the practice of this invention. Examples of suitable dispersing means include hydrophilic pigment dispersing agents. Any hydrophilic dispersing agent that is compatible with the pigment may be employed in the practice of this invention. Examples of classes of polymeric dispersing agents commonly used to disperse pigment particles in aqueous media include random, block, and branched-type polymers. The polymer may be anionic, cationic, or nonionic in nature.

It is contemplated that a commercially available concentrated aqueous pigment dispersion is employed in the practice of this invention. Examples of such pigments dispersions include Hostafine Yellow and Hostafine Green, Fuji BBL Red and Fuji BBL Magentas.

The pigment particle size is an important consideration in ink-jet printing, since the pigment particles must be sufficiently small to permit free flow of the ink through the ink jet printing devices. For example, the ejecting nozzles of thermal inkjet office printers typically have diameters on the order of about 10 to 60 micrometers. The pigment particle size is also important in considerations of stability and color strength. Given these considerations, the range of useful particle size is about 0.005 to 15 micrometers. Preferably, the pigment particle size should range from about 0.005 to about 1 micrometer.

Illustrative examples of suitable pigments that are identified with respect to the Color Index include but are not limited to: pigments black 1, 7, 11, and 31; pigments blue 1,9,14, 15, 16, 27, 28, 29, 36, 60, and 61; pigments brown 24, 29, and 31; and pigments green 1, 2, 7, 36, and 50; pigments orange 5, 13, 16, 34, 36, 43, 46, 67, and 69; and pigments red 2, 3, 4, 5, 78, 17, 19, 22, 23, 31, 38, 48, 49, 2, 57, 63, 81, 88, 100, 101, 104, 112, 122, 146, 149, 170, and 179; pigments violet 2, 3, 9, 19, 23, and 29; and pigments yellow 1, 3, 12, 13, 14, 17, 34, 65, 74, 83, and 97.

All concentrations herein are in weight percent, unless otherwise indicated. The purity of all components is that employed in normal commercial practice for ink-jet inks. All references are hereby incorporated by reference.

Ink-jet Ink Vehicle—The ink compositions of this invention comprise the pigment, dispersant, a bleed controlling polymer(s), and the ink vehicle. For a discussion of inks and their properties, see *The Printing Manual*, $5^{th}$ ed. Leach et al. (Chapman and Hall, 1993). See also U.S. Pat. Nos. 2,833,736; 3,607,813; 4,104,061; 4,770,706; and 5,026,755.

A typical formulation for an ink useful in the practice of the invention includes the pigment colorant (about 0.001% to 10 wt %), a dispersant (about 0.001% to 10%), one or more cosolvents (0.01 to about 50 wt %), one or more water-soluble surfactants/amphiphiles (0 to about 40, preferably about 0.1 to about 5 wt %), one or more high molecular weight colloids (0 to about 3 wt %), and water (balance). Of course, one or more of the inks in the ink-set will contain the bleed controlling polymer(s), present in a amount of from about 0.1 to about 10 % by wt of the ink composition, preferably from 0.1 to about 3%.

One or more cosolvents may be added to the vehicle in the formulation of the ink. Classes of cosolvents employed in the practice of this invention include, but are not limited to, aliphatic alcohols, aromatic alcohols, diols, glycol ethers, poly(glycol) ethers, caprolactams, lactones, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, ethylene glycol alkyl ethers, propylene glycol alkyl ethers, poly(ethylene glycol) alkyl ethers, higher homologues of poly(ethylene glycol) alkyl ethers, poly(propylene glycol) alkyl ethers, higher homologues of poly(propylene glycol) alkyl ethers, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The cosolvent concentration may range from about 0.01 to about 50 wt %, with about 0.1 to 20 wt % being preferred.

Water-soluble surfactants may be employed in the formulation of the vehicle of the ink. These surfactants are added as free components to the ink formulation and are not otherwise associated or intended to become part of the polymers described herein. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; POE amides; and dimethicone copolyols. Amphoteric surfactants such as substituted amine oxides are useful in the practice of this invention. Cationic surfactants such as protonated POE amines may also be used. U.S. Pat. No. 5,106,416, discloses more fully most of the surfactants listed above. The non-ionic amphiphiles/surfactants are more preferred than the ionic surfactants. Specific examples of amphiphiles/surfactants that are preferably employed in the practice of this invention include iso-hexadecyl ethylene oxide 20, SURFYNOL CT-111, TERGITOL 15-S-7, and amine oxides, such as N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide. The concentration of the amphiphile/surfactants may range from 0 to 40 wt %, preferably from about 0.1% to 3 wt %.

To further improve optical density, between 0 and about 3 wt % of a high molecular weight colloid derived from natural or synthetic sources may optionally be added to the ink formulation. Addition of a high molecular weight colloid improves print quality. Example of high molecular weight colloids employed in the practice of this invention include alginates, mannuronic acid, carageenan, guar gum, xanthan gum, dextran, chitin, chitosan, carboxymethylcellulose, nitromethylcellulose, and all derivatives thereof. These colloids are disclosed in U.S. Pat. No. 5,133,803, "High Molecular Weight Colloids for Bleed Control." The preferred concentration of the high molecular weight component colloid in the inks of this invention is from about 0.1% to about 0.75 wt %.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms. Preferred examples of biocides include Urarcide™ and Proxel™, and NuoCept™. Sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are formulated by combining the various components of the vehicle and mixing them with the colorants and polymers disclosed herein. The viscosity of the final ink composition is from about 0.8 to about 8 cPs, preferably from about 0.9 to about 4 cPs.

A method of ink-jet printing is also disclosed herein. The inks of this invention may be used in any conventional ink-jet or bubble-jet or piezoelectric printer. Preferably the inks are used in thermal ink-jet printers. The ink is typically charged into a printer cartridge and printed on any medium. Examples of suitable media for printing includes paper, textiles, wood, and plastic.

EXAMPLES

The following are two examples of improvements in black to yellow bleed. In both examples, black ink from a HP 2000 Professional® Series printer was spiked with 0.4% of a polymer of this invention. Polymer 1 contains monomers of octylacrylarmide, butylaminoethyl methacrylate, and other acrylic monomers (at least one of which is an acidic monomer) and has an acid number of approximately 140 mg KOH/gram. Polymer 2 contains methyl methacrylate, ethyl acrylate, and methacrylic acid having an acid number of 124 mg KOH/gram. The black ink is known to be a pigmented ink that is stabilized with a dispersant and having a pH of about 8 to 8.5. The inks are filled into black pens designed for the HP 2000C Professional® Series printer. A non-spiked ink is also used as a control.

Example 1

Three color inks are prepared using 2%, 4.5%, and 7% succinic acid and having the following common ingredients: 7.5% 2-pyrrolidone, 8% 1,5-pentanediol, 1.5% Tergitol 15-S-7 surfactant, Direct Yellow 132 (Absorbance of 0.12 at 1/10,000 dilution) and the balance water. The pH is adjusted to 4.0 with KOH. The inks are filled into color inkjet pens designed for the HP 2000C Professional® Series printer.

The pens are loaded into a HP 2000C Professional® Series printer. Using Union Camp Jamestown paper, black lines measuring about 0.1 inch are printed and flanked by two yellow boxes with combinations of the above black and yellow inks. The amount of black to yellow bleed is determined by measuring the difference in the black line width (in mils) with and without the flanking yellow boxes. The resulting black to yellow bleed for the various combinations are shown in FIG. 1.

Note that when the specific polymer additives are present, the bleed is reduced and good results are obtained with lower levels of succinic acid when compared the control. Similar results are achieved using other acids, such as citric, glutaric, oxalic, etc.

FIG. 1

Black to Yellow Bleed with 0.4% Polymeric Bleed Additive-Bleed (Mils)

| % Succinic Acid in Yellow | Control | Control + Polymer 1 | Control + Polymer 2 |
| --- | --- | --- | --- |
| 2% | 8.05 | 5.05 | 4.2 |
| 4.5% | 3.65 | 2.7 | 2.55 |
| 7% | 3.95 | 2.05 | 1.85 |

Example 2

Three color inks are prepared using 2%, 4.5% and 7% calcium nitrate hexahydrate and having the following components in common: 7.5% 2-pyrrolidone, 8% 1,5-pentanediol, 1.75% Tergitol 15-S-7 surfactant, Acid Yellow 23 (Absorbance of 0.13 at 1/10,000 dilution) and the balance water. The pH ranges from 7.0 to 7.5. The inks are filled into color inkjet pens designed for the HP 2000C Professional® Series printer.

The pens are loaded into a HP 2000C Professional® Series printer. Using Union Camp Jamestown paper, black lines measuring about 0.1 inch are printed and flanked by two yellow boxes with combinations of the above black and yellow inks. The amount of black to yellow bleed is determined by measuring the difference in the black line width (in mils) with and without the flanking yellow boxes. The resulting black to yellow bleed for the various combinations is shown in FIG. 2.

Note that when the specific polymer additives are present, the bleed is reduced and good results are obtained with lower levels of calcium ion when compared the control. Similar results are achieved using other multivalent ions, such as $Mg^{2+}$, $Al^{2+}$, and etc.

FIG. 2

Black to Yelow Bleed with 0.4% Polymeric Bleed Additive
Eyegore Bleed (Mils)

| % Calcium Nitrate Tetrahydrate in Yellow | Control | Control + Polymer 1 | Control + Polymer 2 |
|---|---|---|---|
| 2% | 6.4 | 3.9 | 2.1 |
| 4.5% | 3.35 | 3.05 | 2.0 |
| 7% | 2.0 | 1.1 | 0.85 |

Industrial Applicability

The method of reducing bleed is expected to find use in ink-jet printing applications involving two or more inks.

Thus, there has been disclosed a method of reducing bleed in printing at least two different inks on a print medium from an ink-jet pen. It will be readily apparent to those skilled in this art that various changes and modifications may be made without departing from the spirit of the invention, and all such changes and modifications are considered to fall within the scope of the invention as defined by the appended claims.

What is claimed is:

1. An ink-jet ink set for ink-jet printing comprising a first ink and a second ink, wherein said first ink comprises at least one pH-sensitive polymer, a pigment, and dispersant and wherein said second ink comprises a multi-valent salt or has an appropriate pH, such that when said first ink and said second ink contact on a print medium, said polymer in said first ink will precipate or flocculate onto said print medium; and wherein said pH-sensitive polymer comprises at least one basic amine monomer unit, at least one acid monomer unit, and at least one hydrophobic monomer unit.

2. An ink-jet ink set for ink-jet printing according to claim 1 wherein said polymer comprises monomer units having the following basic structure:

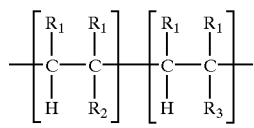

wherein each $R_1$ is selected from the group consisting of H and a $C_1$–$C_{18}$ branched or unbranched, alkyl, aromatic, or cyclic chain, optionally containing halogen, ester, ether, amine or amide functionalities; $R_2$ is selected from the group consisting of a moiety containing a carboxylic acid group having a $pK_a$ of from about 5.0 to about 7.5, primary amine, secondary amine, tertiary amine, and mixtures thereof; and $R_3$ is selected from the group consisting of a $C_1$–$C_{18}$ branched or unbranched, alkyl, aromatic, or cyclic chain, optionally containing ester, ether, amine or amide functionalities; said monomer units present in an amount sufficient to provide a stable polymer when solubilized in water yet will precipate or flocculate upon contact with said second ink.

3. An ink-jet ink set for ink-jet printing according to claim 2 wherein said $R_1$ is independently selected from the group consisting of H, $CH_3$, halogen, halogenated methyl group, and mixtures thereof.

4. An ink-jet ink set for ink-jet printing according to claim 2 wherein said polymer comprises monomer units with carboxylic acid functionalities selected from the group consisting of acrylic acid, methacrylic acid, crotonic acid, 2-trifluoromethylacrylic acid, 2-bromoacrylic acid, and mixtures thereof.

5. An ink-jet ink set for ink-jet printing according to claim 4 wherein said polymer has an acidity, measured by the acid number, of from about 55 to about 400 mg KOH/g of polymer.

6. An ink-jet ink set for ink-jet printing according to claim 2 wherein said polymer comprises amine functionalities selected from the group consisting of 2-(diethylamino)ethyl acrylate, 2-(dimethylamino)ethyl acrylate, 3-(dimethylamino)propyl acrylate, butylaminoethyl methacrylate, 2-aminoethyl methacrylate, N-acrylamide, and mixtures thereof.

7. An ink-jet ink set for ink-jet printing according to claim 6 wherein the amount of basic nitrogen in said polymer, measured as the meq of basic nitrogen per gram, is from about 1 to about 7 meq/g.

8. An ink-jet ink set for ink-jet printing according to claim 2 wherein said polymer comprises hydrophobic monomer units selected from the group consisting of methyl esters or ethyl esters of acrylic, methacrylic acids, ethyl-2-(bromomethyl) acrylate, propyl acrylate, propyl methacrylate, butyl acrylate, butyl methacrylate, isoamyl acrylate, hexyl acrylate, hexyl methacrylate, cyclohexyl acrylate, cyclohexyl methacrylate, alkyl derivatives of cyclohexyl acrylate and methacrylate, ethylhexyl acrylate, ethylhexyl methacrylate, trimethylhexyl acrylate, isooctyl acrylate, isodecyl acrylate, dodecyl acrylate, tridecyl methacrylate, octadecyl acrylate, isobornyl acrylate, isobornyl methacrylate, phenyl methacrylate, benzyl methacrylate, 2-butoxyethyl acrylate, 2-butoxyethyl methacrylate, 2-ethoxyethyl acrylate, neopentyl glycol acrylate benzoate, ethylene glycol phenyl ether acrylate, hydroxybutyl acrylate, alkyl esters of crotonic acid, N,N-dimethylacrylamide, N-isopropylacrylamide and methacrylamide, N-octylacrylamide, N-(butoxymethyl) acrylamide, N-(isobutoxymethyl)acrylamide, methyl-2-acrylamido-2-methoxyacetate, vinyl acetate, vinyl neodecanoate, cyclohexyl vinyl ether, 2-ethylhexyl vinyl ether, styrene, and mixtures thereof.

9. An ink-jet ink set for ink-jet printing according to claim 2 wherein said polymer comprises monomer units having the following basic structure:

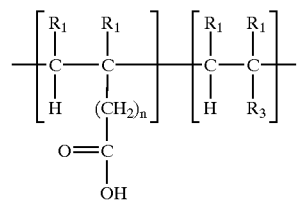

wherein $R_1$ is selected from the group consisting of H and a $C_1$–$C_{18}$ branched or unbranched, alkyl, aromatic, or cyclic chain, optionally containing ester, ether, amine or amide functionalities; n is from 0 to about 15, so as long as the group has a $pK_a$ of from about 5.0 to about 7.5; and $R_3$ is selected from the group consisting of a $C_1$–$C_{18}$ branched or unbranched, alkyl, aromatic, or cyclic chain, optionally containing ester, ether, amine or amide functionalities.

10. An ink-jet ink set according to claim 1 wherein said second ink comprises multi-valent salts, said salts are selected from the group consisting of alkaline earth metals of group 2A of the periodic table; transition metals of group 3B of the periodic table; cations from group 3A of the periodic table; lanthanides; and mixtures thereof; said salt is present in an amount ranging from about 1% to about 10% by weight of said second ink.

11. An ink-jet ink set according to claim 10 wherein said multi-valent salts are selected from the group consisting of magnesium, calcium, lanthanum, aluminum, neodymium, and mixtures thereof.

12. An ink-jet ink set according to claim 1 wherein said second ink comprises organic acid buffers, said organic acid has a $pK_a$ equal to or less than that of said pH-sensitive polymer of said first ink.

13. An ink-jet ink set according to claim 12 wherein said organic acid is selected from the group consisting of polyacrylic, acetic, glycolic, malonic, malic, maleic, ascorbic, succinic, glutaric, fumaric, citric, tartaric, lactic, sulfonic, and ortho-phosphoric acid, derivatives thereof and mixes thereof.

14. An ink-jet ink set according to claim 12 wherein said second ink comprises from about 1% to about 10%, by weight of the ink, of said organic acid.

15. An ink-jet ink set according to claim 2 wherein said polymer comprises monomer units selected from the group consisting of: a) 8:92 acrylic acid:butyl acrylate, acid number 62 mg KOH/g; b) 10:90 methacrylic acid:butyl acrylate, acid number 65 mg KOH/g; c) 12:88 acrylic acid:ethyl acrylate, acid number 93 mg KOH/g; d) 14:86 methacrylic acid:ethyl acrylate, acid number 91 mg KOH/g; e) 16:60:24 acrylic acid:methyl methacrylate:hexyl acrylate, acid number 125 mg KOH/g; f) 16:5:15:64 acrylic acid:butylaminoethyl methacrylate:octylacrylamide:methylmethacrylate, acid number 125 mg KOH/g; g) 19:40:41 methacrylic acid:ethyl acrylate:methyl methacrylate, acid number 124 mg KOH/g; h) 30:30:30 methacrylic acid:methyl methacrylate:benzyl methacrylate, acid number 195 mg KOH/g; 44:56 acrylic acid:ethyl acrylate, acid number 325 mg KOH/g; and mixtures thereof.

16. An ink-jet ink set according to claim 1 wherein said first ink and said second ink are further formulated with an ink-jet vehicle.

17. A met of reducing bleed between at least two different inks on a print medium, said at least two different inks comprising a first ink composition and a second ink composition; said method comprising:

a) formulating said first ink to comprise a pigment, a dispersant, and a pH-sensitive polymer, said pH-sensitive polymer comprises at least one basic amine monomer unit, at least one acid monomer unit, and at least one hydrophobic monomer unit; and b) formulating said second ink to comprise a sufficient amount of an multi-valent salt which in incompatible with said pH-sensitive polymer or a sufficient amount of an organic acid such that said second ink has an appropriate pH when printed on a print medium; and c) contacting said inks by printing onto a medium such that said first ink will precipitate or flocculate onto said print medium to effect a reduction in migration of said first ink into second said ink, thereby reducing bleed between said at least two different inks.

18. A method of reducing bleed according to claim 17 wherein said first ink and said second ink are further formulated with an ink-jet vehicle.

19. A method of reducing bleed according to claim 18 wherein said second ink comprises a colorant selected from the group consisting of a dye, a self-dispersing pigment, and a pigment dispersed with a dispersant.

20. A method of reducing bleed according to claim 17 wherein said polymer comprises monomer units having the following basic structure:

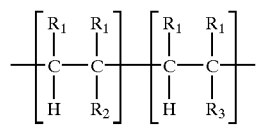

wherein $R_1$ is selected form the group consisting of H or a $C_1$–$C_{18}$ branched or unbranched, alkyl, aromatic, or cyclic chain, optionally containing halogen, ester, ether, amine or amide functionalities; $R_2$ is selected from the group consisting of a moiety containing a carboxylic acid group having a $pK_a$ of from about 5.0 to about 7.5, primary amine, secondary amine, tertiary amine, and mixtures thereof; and $R_3$ is selected from the group consisting of a $C_1$–$C_{18}$ branched or unbranched, alkyl, aromatic, or cyclic chain, optionally containing ester, ether, amine or amide functionalities; said monomers present in an amount sufficient to provide a stable polymer when solubilized in water yet will precipate or flocculate upon contact with said second ink.

21. A method of reducing bleed according to claim 20 wherein said polymer comprises monomer units with carboxylic acid functionalities selected from the group consisting of acrylic acid, methacrylic acid, crotonic acid, 2-trifluoromethylacrylic acid, 2-bromoacrylic acid, and mixtures thereof.

22. A method of reducing bleed according to claim 21 wherein said polymer have an acidity, measured by the acid number, of from about 55 to about 400 mg KOH/g of polymer.

23. A method of reducing bleed according to claim 20 wherein said polymer comprises amine functionalities selected from the group consisting of 2-(diethylamino)ethyl acrylate, 2-(dimethylamino)ethyl acrylate, 3-dimethylamino)propyl acrylate, butylaminoethyl methacrylate, 2-aminoethyl methacrylate, N-acrylamide, and mixtures thereof.

24. A method of reducing bleed according to claim 23 wherein the amount of basic nitrogen in said polymer, measured as the meq of basic nitrogen per gram, is from about 1 to about 7 meq/g.

25. A method of reducing bleed according to claim 20 wherein said polymer comprises hydrophobic monomer units selected from the group consisting of methyl esters or ethyl esters of acrylic, methacrylic acid, ethyl-2-(bromomethyl)acrylate, propyl acrylate, propyl methacrylate, butyl acrylate, butyl methacrylate, isoamyl acrylate, hexyl acrylate, hexyl methacrylate, cyclohexyl acrylate, cyclohexyl methacrylate, alkyl derivatives of cyclohexyl acrylate and methacrylate, ethylhexyl acrylate, ethylhexyl methacrylate, trimethylhexyl acrylate, isooctyl acrylate, isodecyl acrylate, dodecyl acrylate, tridecyl methacrylate, octadecyl acrylate, isobornyl acrylate, isobornyl methacrylate, phenyl methacrylate, benzyl methacrylate, 2-butoxyethyl acrylate, 2-butoxyethyl methacrylate, 2-ethoxyethyl acrylate, neopentyl glycol acrylate benzoate, ethylene glycol phenyl ether acrylate, hydroxybutyl acrylate, alkyl esters of crotonic acid, N,N-dimethylacrylamide, N-isopropylacrylamide and methacrylamide, N-octylacrylamide, N-(butoxymethyl) acrylamide, N-(isobutoxymethyl)acrylamide, methyl-2-acrylamido-2-methoxyacetate, vinyl acetate, vinyl neodecanoate, cyclohexyl vinyl ether, 2-ethylhexyl vinyl ether, styrene, and mixtures thereof.

26. A method of reducing bleed according to claim 20 wherein said polymer comprises monomer units having the following basic structure:

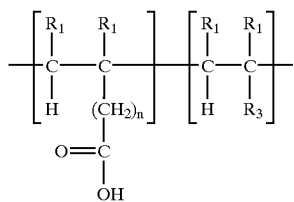

wherein $R_1$ is selected from the group consisting of H or a $C_1$–$C_{18}$ branched or unbranched, alkyl, aromatic, or cyclic chain, optionally containing ester, ether, amine or amide functionalities; n is from 0 to about 15, so as long as the group has a $pK_a$ of from about 5.0 to about 7.5; and $R_3$ is selected from the group consisting of a $C_1$–$C_{18}$ branched or unbranched, alkyl, aromatic, or cyclic chain, optionally containing ester, ether, amine or amide functionalities.

27. A method of reducing bleed according to claim 17 wherein said second ink comprises multi-valent salts, said salts are selected from the group consisting of alkaline earth metals of group 2A of the periodic table; transition metals of group 3B of the periodic table; cations from group 3A of the periodic table; lanthanides; and mixtures thereof; said salt is present in an amount ranging from about 1% to about 10 by weight of said second ink.

28. A method of reducing bleed according to claim 27 wherein said multi-valent salts are selected from the group consisting of magnesium, calcium, lanthanum, aluminum, neodymium, and mixtures thereof.

29. A method of reducing bleed according to claim 17 wherein said second ink comprises organic acid buffers, said organic acid has a $pK_a$ equal to or less than that of said pH-sensitive polymer of said first ink.

30. A method of reducing bleed according to claim 29 wherein said organic acid is selected from the group consisting of polyacrylic, acetic, glycolic, malonic, malic, maleic, ascorbic, succinic, glutaric, fumaric, citric, tartaric, lactic, sulfonic, and ortho-phosphoric acid, derivatives thereof, and mixtures thereof.

31. A method of reducing bleed according to claim 30 wherein said second ink comprises from about 1% to about 10%, by weight of the ink, of said organic acid.

* * * * *